United States Patent
Groll

(10) Patent No.: US 7,488,515 B2
(45) Date of Patent: Feb. 10, 2009

(54) METHOD OF MAKING NON-STICK COOKWARE

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 42 days.

(21) Appl. No.: 10/804,561

(22) Filed: Mar. 19, 2004

(65) Prior Publication Data

US 2005/0208272 A1    Sep. 22, 2005

(51) Int. Cl.
- *B05D 5/08* (2006.01)
- *B05D 3/02* (2006.01)
- *B05D 3/12* (2006.01)
- *B05D 1/08* (2006.01)
- *A47J 36/02* (2006.01)

(52) U.S. Cl. .................. 427/294; 427/515; 427/521; 427/350; 427/387; 427/402

(58) Field of Classification Search .................. 427/446, 427/448, 453, 455, 456, 515, 521, 230, 236, 427/238, 255.11, 255.12, 255.18, 255.21, 427/294, 295, 350, 372.2, 387, 402; 220/573.2
See application file for complete search history.

(56) References Cited

U.S. PATENT DOCUMENTS

| | | | |
|---|---|---|---|
| 3,271,653 A * | 9/1966 | Wolf | 220/573.2 |
| 4,204,021 A * | 5/1980 | Becker | 428/325 |
| 4,646,935 A | 3/1987 | Ulam | |
| 5,320,879 A * | 6/1994 | Bullock | 427/576 |
| 5,952,112 A | 9/1999 | Spring | |
| 6,267,830 B1 | 7/2001 | Groll | |
| 6,360,423 B1 * | 3/2002 | Groll | 29/527.2 |

* cited by examiner

*Primary Examiner*—William Phillip Fletcher, III
(74) *Attorney, Agent, or Firm*—The Webb Law Firm

(57) ABSTRACT

A non-stick surface comprising a porous, hard metal-ceramic coating such as chromium oxide applied to the cook surface of a cooking utensil by arc or plasma spraying. The pores of the coating are impregnated under vacuum with an inert release agent of low viscosity such as food grade liquid silicon resin. After vacuum impregnation, the impregnate is thermally cured and the cook surface is mechanically abraded/polished to remove the protruding peaks of metal-ceramic material to expose flattened bare metal portions interspersed between and substantially co-planar with the surfaces of the impregnated release agent residing in the valleys/pores.

7 Claims, 3 Drawing Sheets

METHOD OF MAKING NON-STICK COOKWARE

BACKGROUND OF THE INVENTION

1. Field of the Invention

The present invention relates to cook surfaces and, more particularly, to non-stick cook surfaces made from an impregnated metal-ceramic material and to a method of making the surface.

2. Description of Related Art

Non-stick cook surfaces are typically made from a PTFE material (polytetrafluoride ethylene) such as the well-known Teflon® brand coating. These PTFE coatings have a finite life due to their organic makeup. Over time, these coatings dry out and lose their lubricity. In addition, the PTFE family of non-stick coatings is relatively soft and very susceptible to scratching, gouging and the like when sharp metal edges come into contact with the coating surface. Hence, care must be taken to use plastic/non-metal utensils when cooking with a PTFE cook surface so as to avoid damaging the surface.

Other attempts have been made to apply ultra-smooth, hard surfaces to provide non-stick properties to cookware. An example of such is a hard, scratch-resistant zirconium nitride non-stick surface disclosed in my U.S. Pat. No. 6,360,423. While this coating improves the food release properties over a bare metal cook surface, it still does not approach that of a new PTFE coated surface.

SUMMARY OF THE INVENTION

Briefly stated, the non-stick cook surface of the present invention comprises, in part, a hard metal-ceramic coating applied to the cook surface of a cooking utensil such as a fry pan, stock pot, griddle plate, waffle iron and the like. The metal-ceramic is preferably chromium oxide, which is applied to the cook surface by high temperature arc spraying. Other metal-ceramic materials such as silicon carbide, titanium oxide, titanium alumina (Ti—$Al_2O_3$) and the like may be used and other application techniques such as oxy-acetylene or plasma spraying may also be employed.

The metal-ceramic coating is applied with a controlled porosity of between 5-15 volume %. A porosity of about 7 volume % has been found to be very good. The metal substrate of the cook surface, such as stainless steel, is first treated by chemical or mechanical means, i.e., degreasing, grit blasting, etc., to clean and prepare the substrate surface prior to application of the metal-ceramic coating in order to provide good adherence of the metal-ceramic coating.

After the metal-ceramic coating has been applied, having a porosity of 5-15 volume %, the pores are impregnated with an inert liquid release agent of low viscosity, preferably a liquefied silicone. A commercially available liquefied silicone is sold as GE SRM 120 silicone resin. The impregnation step is preferably conducted under a vacuum to ensure that all of the voids or pores in the metal-ceramic coating are filled with the impregnate material, in this instance liquefied silicone resin. The inert impregnated release agent prevents cooking oils and food particles from infiltrating into the pores of the metal-ceramic coating and, thus, prevents potential bacteria growth. Use of the vacuum impregnation technique also ensures that all of the pores communicating with the surface are closed with the impregnate.

After the porous metal-ceramic layer has been vacuum impregnated, the impregnate silicone resin is thermally cured at a temperature of about 550° F. The cook surface, with the above-applied layer of cured silicone impregnated pores, of chromium oxide, for example, is then surface finished by mechanical abrading/polishing, as with a "Hi-Lite" machine or the like, to remove the peaks of metal-ceramic that might be protruding upwardly on the impregnated metal-ceramic surface. The cook surface is then in a condition for service. The polished surface comprises bare metal portions made up of flattened peaks which have been leveled by the mechanical abrading/polishing step and have the impregnate material removed to expose the underlying bare metal. The bare metal portions of the flattened peaks are co-planar with the surrounding areas of the impregnate-filled valleys (previously occupied by open pores).

While the presently preferred use of the non-stick surface of the invention is for a cook surface, it is also suitable for other applications where a low coefficient of friction and scratch resistance is desirable, such as, for example, in a sole plate for an iron.

DETAILED DESCRIPTION OF THE INVENTION

Figure 1:
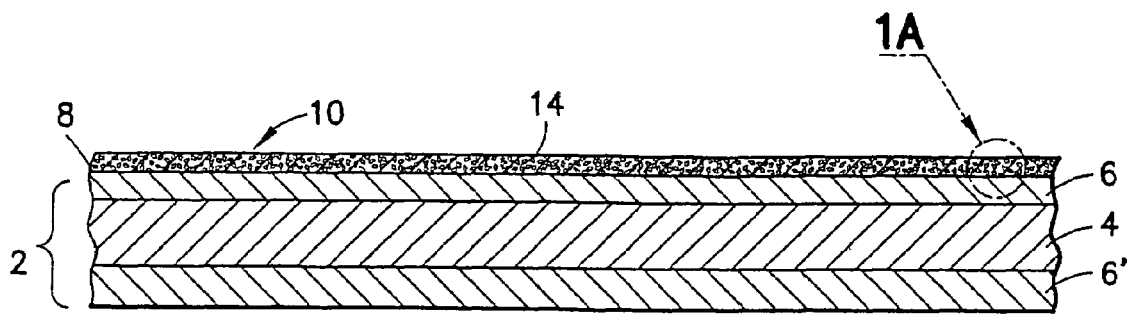
FIG. 1 is a fragmented, enlarged, cross-sectional, schematic view of a substrate with a porous metal-ceramic layer applied thereto.
Figure 2:
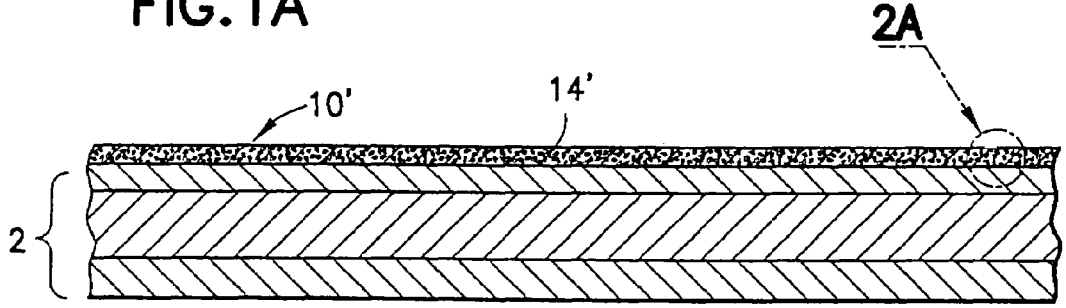
FIG. 2 is a cross-sectional view of the substrate of FIG. 1 with the porous metal-ceramic layer impregnated with a silicone resin material.
Figure 3:
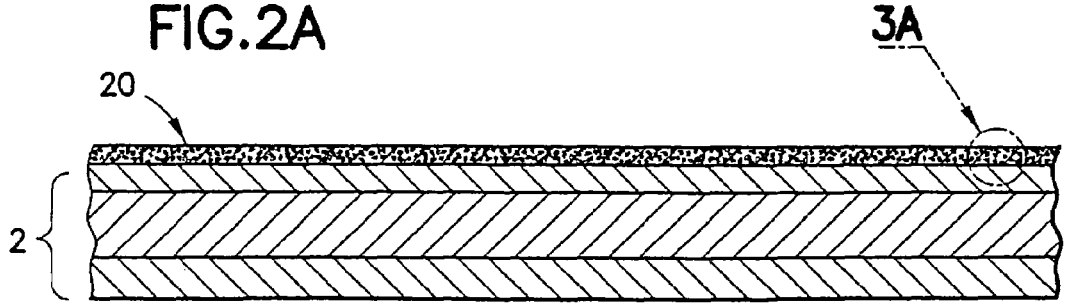
FIG. 3 is a cross-sectional view of the impregnated substrate of FIG. 2 after mechanical polishing depicting the non-stick surface of the present invention.
Figure 3A:
FIG. 3A is an enlarged fragmented view of the surface of FIG. 3.
Figure 4:
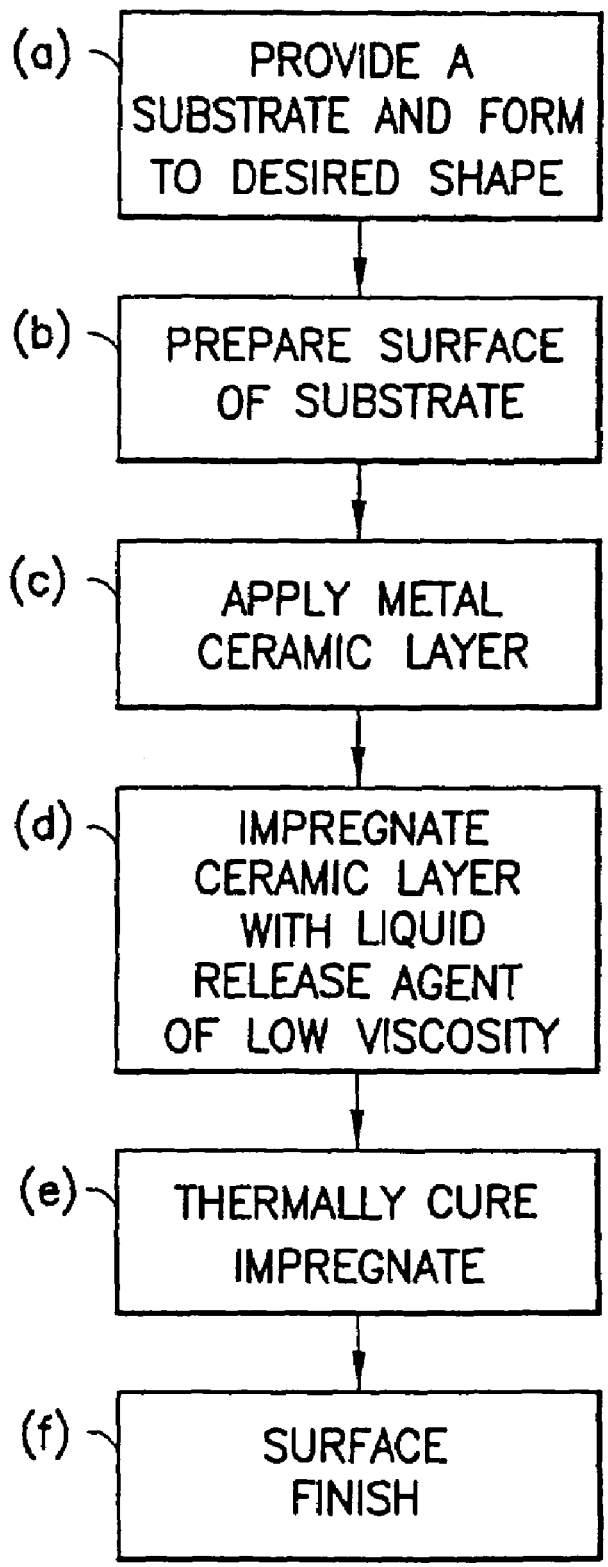
FIG. 4 is a schematic flow-chart showing the steps of a process of the present invention for making a non-stick surface suitable for cookware and bakeware.
Figure 5:
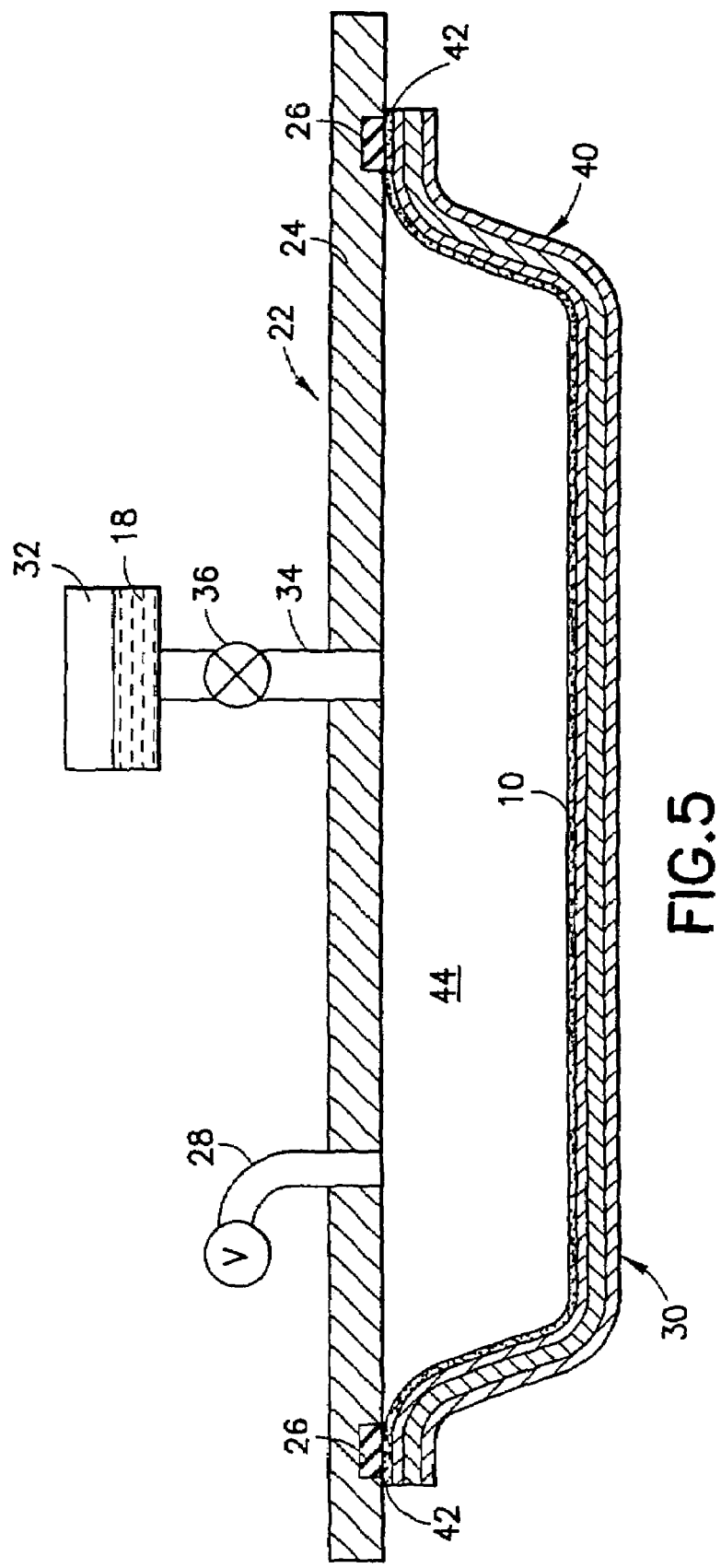
FIG. 5 is a cross-sectional view of a cooking utensil in the form of a fry pan in a vacuum fixture for impregnating the non-stick cook surface of the present invention with an inert liquid release agent.

The finished non-stick surface 10 of the present invention is depicted schematically in FIGS. 3 and 3A of the drawings. FIGS. 1 and 2 schematically show the appearance of the substrate 2 as the non-stick surface 20 of the invention is prepared during manufacture. FIG. 4 represents a flow chart which lists the presently preferred steps employed in practicing the manufacturing method of the invention to produce the unique non-stick surface 20. FIG. 5 depicts a cooking utensil 30 in the form of a fry pan 40 in a vacuum fixture for impregnation of the non-stick surface 10 of the present invention.

The substrate 2 preferably comprises a cooking utensil and may be of any typical construction of the type used in making cookware. FIGS. 1-3 and 5 show a conventional composite metal substrate 2 for cookware comprising a core layer 4 of a metal having a high coefficient thermal conductivity such as aluminum or copper. The core layer 4 is metallurgically bonded as by rolling to outer clad metal layers 6 and 6', such as stainless steel. Known composite cooking utensils may typically include three and upwards of nine such clad metal layers. All of these composite clad constructions are collectively referred to herein as the substrate 2. The manufacture of such composite clad metal substrates 2 for use in cookware and bakeware (collectively referred to herein as "cookware") is well known in the art as evidenced by U.S. Pat. No. 6,267,830 to Groll; U.S. Pat. No. 5,952,112 to Spring; and U.S. Pat. No. 4,646,935 to Ulam, the contents of which are incorporated by reference herein. It is also known to provide a lower layer, such as clad layer 6', made of a ferromagnetic material such as a 400 grade stainless steel so as to provide a cooking utensil that may be heated by induction. The metal substrate 2, of course, can also be made of a single ply of metal, if desired, without departing from the scope and spirit of the present invention. In addition, the substrate can be a griddle plate, waffle plate or the like, all falling within the definition of "cookware" as used herein. A preferred construction for cookware, however, comprises a composite clad metal with a core layer of a high thermal conductivity such as aluminum or copper, with a harder, corrosion-resistant metal such as stainless steel located at the cook surface 6 and at the outer surface 6', in the configuration of a fry pan, stock pot, and the like.

The method of making the non-stick surface of the present invention will best be understood when the processing steps (a) to (f) of FIG. 4 are explained with reference to the metal composite substrate 2 depicted in FIGS. 1-3. A substrate 2 is provided in step (a) of FIG. 4 and shaped to a desired cookware, bakeware (or other desired product) configuration, such as a fry pan, stock pot, searing pan, griddle plate, and the like, all well known shapes and sizes known in the cookware art.

The surface 8 of the substrate, that is, the surface comprising stainless steel (or other metal) forming outer layer 6, shown in FIG. 1, is prepared in step (b) of FIG. 4 by chemical or mechanical means such as by degreasing, grit blasting and the like, to remove dirt, grease, and surface impurities prior to application of the metal-ceramic layer 10 in process step (c) of FIG. 4.

The metal-ceramic layer 10 may be one of titanium oxide (TiO), chromium oxide (CrO), titanium alumina (Ti—$Al_2O_3$), silicone carbide (SiC), molybdenum oxide (MoO) and mixtures of these materials, or other non-toxic, non-reactive materials which are porous and retain high hardness after application to substrate 2. Presently, chromium oxide has been found to perform exceptionally well as a metal-ceramic layer 10.

The metal-ceramic layer 10 is applied at a thickness of about 0.002-0.020 inch and, more preferably, between 0.005-0.019 inch, by a conventional technique such as by arc spraying, plasma spraying, oxyacetylene, high velocity oxygen fusion (HVOF) and the like, onto the prepared surface 8 of the substrate 2. An ideal thickness for layer 10 is about 0.008 inch.

Figure 1A:
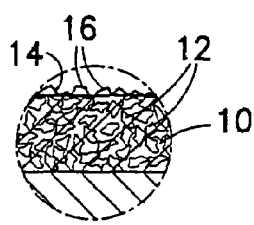
FIG. 1A is an enlarged, fragmented view of the porous metal-ceramic layer of FIG. 1.

The as-applied metal-ceramic layer 10 possesses a plurality of pores 12 as schematically shown in FIG. 1A having a porosity of between about 5-20% by volume and, more preferably, between about 5-15% by volume, comprising a network of interconnected voids or pores 12. I have found that a porosity of about 7% by volume performs extremely well in the metal-ceramic layer 10.

The as-applied metal-ceramic layer 10 also has a somewhat rough outer surface 14 which is characterized by many upstanding sharp "peaks" 16 of the as-applied metal-ceramic material, FIG. 1A, which is typical of plasma sprayed coatings.

Figure 2A:
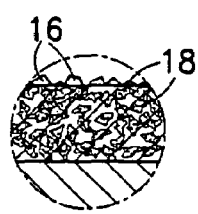
FIG. 2A is an enlarged, fragmented view of the impregnated metal-ceramic layer of FIG. 2.

The pores 12 of the as-applied metal-ceramic layer 10 are then filled, preferably by vacuum impregnation with a liquid release agent of low viscosity in step (d) of the process outlined in FIG. 4 and shown schematically in FIGS. 2 and 2A. After impregnation, the impregnated metal-ceramic layer 10 has substantially all of its pores 12 filled with the release agent 18, FIG. 2A. After impregnation, the raised peaks 16 of metal-ceramic material remain so that the outer surface 14 of the impregnated metal-ceramic layer 10 is still somewhat rough, FIG. 2A.

A presently preferred liquid release agent 18 for pore impregnation is silicone resin having a viscosity of between about 40 to 100 centipoise (Cp) and more preferably between 40 to 60 Cp. A presently preferred silicone resin for use as release agent 18 is commercially available from the General Electric Company, identified as SRM 120 silicone resin. This material is ideal for use in conjunction with food preparation due to its non-toxic, inert properties. The silicone resin can also contain a black-colored pigment for cosmetic purposes.

The substrate 10 is preferably impregnated under a vacuum of greater than 28 inches of mercury, using a vacuum apparatus 22 shown in FIG. 5. A shaped piece of cookware 30, such as fry pan 40, having a metal-ceramic layer 10 previously applied thereto, is impregnated as follows. An air-impervious sealing cover or lid 24 having a rubber sealing gasket 26 therearound is placed on the upper edge 42 of the fry pan 40 to make a sealable engagement therewith. A vacuum pump "V" is placed into communication via conduit 28, with the interior space 44 defined by the volume of space inside the fry pan 40 under the lid 24. A vacuum is drawn to the desired level and a liquid release agent 18 contained in reservoir 32 is introduced into interior space 44 by way of a conduit 34 upon opening of a valve 36. The liquid release agent 18 flows into space 44 and evenly coats the surface of the pan 40. The vacuum is then released and the subsequent rush of atmospheric pressure into the interior space 44 causes the liquid release agent 18 to impregnate the interconnected pores 12 and forms the impregnated metal-ceramic layer 10' of FIG. 2. The thus-impregnated pan 40 is then placed in an oven at about 550° F. to thermally cure the silicon resin release agent residing in the pores of the metal-ceramic layer.

After the metal-ceramic layer 10' has been impregnated and thermally cured, the rough surface 14' is still present by virtue of the "peaks" 16 of the upwardly protruding tips of the metal-ceramic material, FIG. 2A. The impregnated metal-ceramic layer 10' is then subjected to a smoothing operation, such as by mechanical polishing in a known "Hi-Lite" machine using, for example, an alumina abrasive or a silicone carbide abrasive grit. The surface 10' can also be subjected to other treatments, such as, for example, grit blasting, diamond wheel grinding or the like to remove the raised peaks 16 as depicted in FIG. 2A. A preferred finish in the polished or otherwise smoothly treated non-stick surface 20 of the present invention is less than about 10 ra and, more preferably, less than about 7 ra. After the vacuum impregnation, curing and mechanical polishing steps, the cooking surface comprises a smooth surface made up of co-planar flat bare metal portions 16' and impregnated valleys 12' which are filled with the impregnate 18. The flat bare metal portions 16' are areas that remain after the peaks 16 have been flattened by the mechanical abrading/polishing step. The finished non-stick surface 20, as seen best in FIG. 3A, is substantially flat, comprising the flattened bare metal portions 16' and the pores/valleys 12' filled with impregnate 18 so that the surfaces of the impregnate 18 are substantially co-planar with the surfaces of the bare metal portions 16'.

EXAMPLES

Several fry pans were made using the standard All-Clad® brand 8-inch diameter fry pans having stainless steel, inside and out, with a roll-bonded aluminum core. The stainless steel cooking surface of the fry pans, after cleaning, was plasma coated with a layer of chromium oxide having a porosity of about 7 volume % and a thickness of 0.004 inch. The pores of the chromium oxide layer were then impregnated with GE brand SRM120 silicon resin under vacuum of greater than 28 inches of Hg in the apparatus depicted in FIG. 5. The impregnated silicon resin was then cured in an oven at 550° F. for at least one hour. The fry pans were then polished using a Hi-Lite mechanical finishing machine to smooth off the "peaks" of chromium oxide using an alumina abrasive. The resulting polished surface of the non-stick surface had an average finish smoothness of less than about 7 ra.

Cooking tests were then run on these fry pans in the dry condition, i.e., using no oil or other lubricant. Standard pancake batter was cooked in one of the tests and over 500 pancakes were cooked to a golden brown color. The pancakes released from the pan without sticking using a metal spatula. The metal spatula did not mark, mar or scratch the non-stick surface. Several pancakes were intentionally left on the fry pans to burn. Subsequent clean-up of the burnt pancakes was found to be relatively easy. Further cooking tests were run using fried eggs as the test food. Similar results were obtained frying eggs on dry skillets as were obtained with the pancakes. Clean-up was also quite easy, even after burning the eggs.

In order to demonstrate the durability of the non-stick surface of the present invention, a sharp-tipped knife having a hardened carbon steel blade was scraped repeatedly across the surface using the knife tip under considerable pressure. The non-stick surface of the pan was not scratched or injured in any way, but did exhibit pencil-like lines thereon where the knife tip traversed the surface. It was observed that these lines were actually metal left from the knife tip on the non-stick surface. This shows that the non-stick surface of the present invention was actually harder than the knife.

The impregnate-filled pores 12' between the surrounding bare metal portions 16' are small in size such that utensils cannot reach the impregnate 18 and, therefore, will not be scratched or marred, even if metal utensils are used. The bare metal portions 16' are much harder than most metals and, likewise, will not be scratched by such metal utensils.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A method for making cookware having a non-stick surface, comprising the steps of:
    (a) providing a substrate in a desired cookware configuration;
    (b) preparing a surface of the substrate to remove dirt, grease, or other surface impurities;
    (c) applying a metal-ceramic layer to the prepared surface of step (b) to provide a controlled porosity of between about 5-15% by volume in said metal-ceramic layer and having a plurality of upstanding peaks;
    (d) vacuum impregnating pores of said metal-ceramic layer with a liquid release agent;
    (e) thermally curing the impregnated liquid release agent; and
    (f) smoothing the impregnated metal-ceramic layer by removing the upstanding peaks of metal ceramic to provide a non-stick surface defined by flat bare metal-ceramic portions and flat impregnated cured release agent areas substantially co-planar therewith.

2. The method of claim 1 wherein the metal-ceramic layer is one or more selected from the group consisting of chromium oxide, silicon carbide, titanium oxide, molybdenum oxide and titanium-alumina and is applied by one of high temperature arc spraying, plasma spraying or oxyacetylene spraying.

3. The method of claim 1 wherein the metal-ceramic layer is applied to a thickness of between 0.002 to 0.006 inch.

4. The method of claim 1 wherein the thickness of the metal-ceramic layer is about 0.004 inch and has a porosity of about 7% by volume.

5. The method of claim 1 wherein the liquid release agent is silicone resin, and wherein the thermal curing step (e) takes place at a temperature of about 550° F.

6. The method of claim 1 wherein the smoothing step (f) includes mechanical polishing to provide a non-stick surface having a surface smoothness of less than 10 ra.

7. The method of claim 1 wherein the metal-ceramic layer is chromium oxide having an applied thickness of about 0.004 inch and a porosity of about 7% by volume and wherein the liquid release agent is silicone resin.

\* \* \* \* \*